(12) United States Patent
Andermann, Jr. et al.

(10) Patent No.: US 9,290,642 B2
(45) Date of Patent: Mar. 22, 2016

(54) PROCESS FOR IMPROVING THE FLOW RATE OF AN AQUEOUS DISPERSION

(75) Inventors: Lawrence Andermann, Jr., Wilmington, DE (US); Jeffrey Peltier, Kennett Square, PA (US); Michael J. Bluemle, Wilmington, DE (US); Markus Broecher, Muehlheim an der Ruhr (DE)

(73) Assignee: Solenis Technologies, L.P., Schaffhausen (CH)

( * ) Notice: Subject to any disclaimer, the term of this patent is extended or adjusted under 35 U.S.C. 154(b) by 0 days.

(21) Appl. No.: 14/003,599

(22) PCT Filed: Mar. 16, 2012

(86) PCT No.: PCT/US2012/029418
§ 371 (c)(1),
(2), (4) Date: Dec. 4, 2013

(87) PCT Pub. No.: WO2012/125918
PCT Pub. Date: Sep. 20, 2012

(65) Prior Publication Data
US 2014/0080944 A1 Mar. 20, 2014

Related U.S. Application Data

(60) Provisional application No. 61/453,695, filed on Mar. 17, 2011.

(30) Foreign Application Priority Data

Apr. 27, 2011 (EP) ..................................... 11003451

(51) Int. Cl.
| | | |
|---|---|---|
| C08L 5/02 | (2006.01) |
| C08L 1/08 | (2006.01) |
| C08L 3/00 | (2006.01) |
| C02F 1/52 | (2006.01) |
| C02F 1/56 | (2006.01) |
| C08L 97/00 | (2006.01) |
| C02F 103/10 | (2006.01) |
| B01D 21/00 | (2006.01) |

(52) U.S. Cl.
CPC ................. *C08L 5/02* (2013.01); *C02F 1/5236* (2013.01); *C02F 1/56* (2013.01); *C08L 1/08* (2013.01); *C08L 3/00* (2013.01); *C08L 97/005* (2013.01); *B01D 21/00* (2013.01); *C02F 2103/10* (2013.01)

(58) Field of Classification Search
CPC ............... C08L 5/02; C08L 3/00; C08L 1/08; C08L 97/005
See application file for complete search history.

(56) References Cited

U.S. PATENT DOCUMENTS

| | | | | |
|---|---|---|---|---|
| 5,229,277 | A | * | 7/1993 | Day et al. ...................... 435/103 |
| 7,875,188 | B2 | | 1/2011 | Dymond et al. |
| 7,901,583 | B2 | | 3/2011 | McColl et al. |
| 2001/0050255 | A1 | | 12/2001 | Barrett |
| 2005/0194292 | A1 | | 9/2005 | Beetge et al. |
| 2009/0116908 | A1 | | 5/2009 | Dymond et al. |
| 2009/0189113 | A1 | | 7/2009 | Camperd et al. |
| 2010/0006510 | A1 | * | 1/2010 | Dymond et al. .............. 210/732 |

FOREIGN PATENT DOCUMENTS

FR 2312536 5/1976

OTHER PUBLICATIONS

Written opinion of the International Search Authority PCT/US12/29418 International Search Report PCT/US12/29418 International Preliminary Report on Patentability PCT/US2012/029418.

* cited by examiner

*Primary Examiner* — Robert Harlan
(74) *Attorney, Agent, or Firm* — Michael J. Herman; Joanne Rossi

(57) ABSTRACT

A process for improving the flow rate of an aqueous dispersion which comprises adding a natural polymer to said aqueous system and then adding a synthetic polymer to the aqueous system.

13 Claims, 2 Drawing Sheets

PROCESS FOR IMPROVING THE FLOW RATE OF AN AQUEOUS DISPERSION

BACKGROUND OF THE INVENTION

1. Field of the Invention

Processes for improving the flow rate of an aqueous system comprising adding natural polymer to the aqueous system, and then adding a synthetic polymer to the aqueous system. The natural polymer may be a polysaccharide, such as dextran.

2. The Related Art

In the production of valuable metals and minerals in mining, ore bodies are typically ground, dispersed in aqueous solutions, treated with agents, and subjected to various processing conditions (temperature, pH, pressure, shear rate). The intended result of the mining operation is to generate aqueous dispersions that will undergo isolation, separation, or purification of the valuable portion of the ore, whether it is a metal or mineral.

Aqueous dispersions that result from the subject mining operations are comprised of mixtures of water, solids, and other materials. Examples of the types of solids typically found in the aqueous dispersions from mineral operations include minerals, metals, metal oxides, metal sulfides, metal hydroxides, salts, organic matter, and other inorganic matter. Aqueous dispersions that are comprised of ores, concentrates, tailings and the like, which may contain particles that have morphologies that are not conducive for rapid sedimentation or pumping are of particular interest. The pumped concentrated aqueous dispersions may contain valuable minerals or metals or waste residues. Valuable resources found in the aqueous dispersions may include minerals (bauxites, latherites, or sulfides), metals (such as iron, base metals, precious metals, light metals, and uranium), coal and the like. The waste streams consist of gangue minerals and other constituents with little or no value. Typically, aqueous dispersions are processed by treatment with flocculating or coagulating agents to initiate liquid-solid separation that concentrates the solids portion of the aqueous dispersion in appropriate separation processes, e.g. centrifuging, concentrating, sedimentation, dewatering, filtering and the like.

Liquid-solid separations facilitated by the use of coagulating and/or flocculating agents are required to further concentrate the aqueous dispersions to reduce the process costs associated with transport, calcination, separation, digestion, or storage. Liquid-solid separations are now more challenging because ore bodies that are processed today contain lower concentrations of the valuable minerals and metals and higher concentration of gangue minerals. Gangue comprises that portion of ore bodies that is unusable or of low value, and gangue typically consists of fine particles of irregular shape. Liquid-solid separations are accelerated by the use of synthetic or natural polymers prior to transporting the aqueous dispersion from where it is found or generated to the facility where it is stored, calcined, separated, or transported. Due to the size and shape of the gangue particles, gangue minerals are more difficult to agglomerate; therefore, higher dosages of synthetic or natural polymer flocculants are required to achieve the same sedimentation rates necessary to maintain desired mill flow rates. What makes the transport of the concentrated aqueous dispersions even more challenging is that the chemicals used to coagulate or flocculate the solids of the aqueous dispersions promote higher rheological parameters, such as higher viscosity or higher yield stress for the concentrated solids and make the solids even more difficult to pump.

Use of high molecular weight, synthetic polymer flocculants imparts higher rheological characteristics making pumping of the aqueous dispersions more difficult, as a consequence operating cost and profitability are negatively impacted. Preferably, concentrated aqueous dispersions should exhibit low yield stresses to allow pumping at low threshold energy levels. Additionally, concentrated aqueous dispersions should possess low viscosities, which should result in fast flow rates through mining processes for improved efficiency, productivity, and lower energy costs at the mills or refineries. In order for mining companies to remain profitable, there is a need for mining operations to be able to process concentrated aqueous dispersions efficiently by reducing the rheological properties of the substrates.

SUMMARY OF THE INVENTION

The disclosure relates to a process for improving the flow rate of an aqueous dispersion which comprises (a) adding a natural polymer to the aqueous dispersion, and (b) then adding a synthetic polymer to the aqueous dispersion.

By using the defined process it was discovered that the yield stress of the aqueous dispersion was reduced. The reduction of the yield stress of the aqueous dispersion is important because aqueous slurries having a lower yield stress can be transported through pipelines and other equipment more rapidly and efficiently, which results in increased productivity and energy savings. The process is of particular significance because the yield stress is reduced without adversely affecting the sedimentation rate or compaction of the solids in the aqueous dispersion. The consequence is that the amount of flocculating agent needed to promote the sedimentation of the solids can be reduced thereby saving expenses on the flocculating agent. The process is particularly useful when the aqueous dispersion contains high amounts of gangue and/or when the shapes of the particles of the solids in the aqueous dispersion are fine and/or of irregular shapes.

The following definitions and abbreviations shall have the following meanings and definitions as set forth in this specification, including the drawings and examples.

AA shall mean and refer to acrylic acid.

AM shall mean and refer to acrylamide.

AMPS shall mean and refer to 2-acrylamido 2-methylpropane sulfonic acid.

Aspect ratio is defined by the ratio of the minimum to the maximum Feret diameter as measured by x-ray diffraction. The aspect ratio provides an indication of the elongation and sphericity of a particle, where the sphericity of the particle is inversely proportional to the aspect ratio.

Mn is the number average molecular weight as determined by SEC-MALLS analysis.

Mw is the weight average molecular weight as determined by SEC-MALLS analysis.

MALLS shall mean and refer to multi-angular laser light scattering.

SEC-MALLS shall mean and refer to a size exclusion chromatography technique using MALLS to determine Mw and Mn.

PDI shall mean and refer to the polydispersibility index, which is a measure of the distribution of molecular mass in a given polymer sample and is Mw divided by the number average molecular weight (Mn), which represents the distribution of molecules of various of molecular weights.

Pa is Pascals, a measure of pressure.

Polysaccharide A shall mean and refer to a dextran having Mw of <50,000.

Polysaccharide B shall mean and refer to a dextran having Mw of 713,000.

Polysaccharide C shall mean and refer to a dextran having Mw of 2,150,000.

Polysaccharide D shall mean and refer to a dextran having Mw of 4,370,000.

Polysaccharide E shall mean and refer to dextran having Mw of 8,870,000.

Polysaccharide F shall mean and refer to a dextran having Mw of 9,860,000.

Synthetic Polymer A is an anionic copolymer available under the trade name PRAESTOL® 2640 from Ashland Inc., Wilmington, Del., U.S.A. ("Ashland") where Mw is about 1,270,000, which is prepared by the free radical polymerization of AA and AM, such that the mole ratio of AA to AM is about 2:3.

Synthetic Polymer B is an anionic copolymer available under the trade name FLOMIN® AL80EH from SNF Floerger, Andrézieu, France where Mw is about 1,760,000, which is prepared by the free radical polymerization of AA and AM, such that the mole ratio of AA to AM is about 4:1.

Synthetic Polymer C is an anionic copolymer available under the trade name PRAESTOL® 2740 from Ashland where Mw is about 1,080,000, which is prepared by the free radical polymerization of AA and AMPS, such that the mole ratio of AA to AMPS is about 5:1.

Synthetic Polymer D is an anionic copolymer, Photafloc 1143.5, available from Neutron Products, Inc., Dickerson, Md., U.S.A. which is prepared by the free radical polymerization of AM and AMPS, such that the mole ratio of AM to AMPS is about 4:1

Yield stress means and refers to the amount of energy required to start a solids moving as measured by vane rheometry.

DETAILED DESCRIPTION OF THE INVENTION

Figure 1:
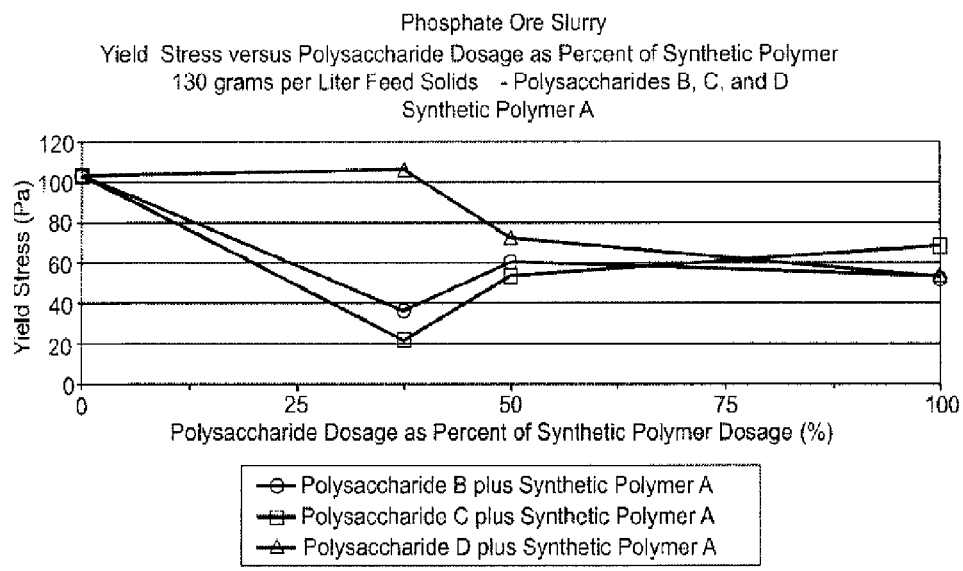
FIG. 1 is a graphic depiction showing the effect of the ratio of polysaccharide dosage to synthetic polymer dosage on the yield stress of an aqueous dispersion containing phosphate ore where a polysaccharide and synthetic polymer were used.

Among the natural polymers that can be used in the process are polysaccharides, such as potato starch, xanthan gums, guars, dextran, cellulose derivatives and glycosaminoglycans, as well as lignosulfonates.

Preferably, the natural polymer used in the subject invention is the polysaccharide dextran. Dextran is generally available from various suppliers including Dextran Products Limited, Toronto, Ontario, Canada and USB Corp., Cleveland, Ohio, U.S.A. Typically used as the polysaccharide is a dextran having a Mw of from about 5,000 to about 40,000,000, preferably from about 50,000 to about 25,000,000 and more preferably from about 200,000 to about 10,000,000. Typically, the PDI of the polysaccharide is from about 1.0 to about 10.0, more typically from about 1.1 to about 9.0, and most typically from about 1.2 to about 8.0. Persons of ordinary skill in these arts, after reading this disclosure, will appreciate that all ranges and values within these explicitly stated ranges are contemplated.

Synthetic polymers that can be used in the process include water-soluble anionic, cationic, nonionic polymers, and amphoteric polymers. For purpose of this disclosure, synthetic polymer shall include copolymers and terpolymers, as well as homopolymers. Typically the synthetic polymer used has a Mw of from about 500,000 to about 25,000,000, preferably from about 750,000 to about 20,000,000, and more preferably from about 1,000,000 to about 18,000,000. The synthetic polymers may be linear, branched, or cross-linked. Persons of ordinary skill in these arts, after reading this disclosure, will appreciate that all ranges and values within these explicitly stated ranges are contemplated.

Nonionic polymers include polymers formed from one or more water soluble ethylenically unsaturated nonionic monomers, for instance acrylamide, methacrylamide, hydroxyethyl acrylate and N-vinylpyrrolidone, preferably acrylamide. Nonionic polymers also include alkoxylated multifunctional alcohols.

Cationic polymers are formed from one or more ethylenically unsaturated cationic monomers optionally with one or more of the nonionic monomers mentioned previously. The cationic polymer may also be amphoteric provided that there are predominantly more cationic groups than anionic groups. The cationic monomers include dialkylamino alkyl(meth)acrylates, dialkylamino alkyl(meth)acrylamides, including acid addition and quaternary ammonium salts thereof, diallyl dimethyl ammonium chloride. Typical cationic monomers include the methyl chloride quaternary ammonium salts of dimethylamino ethyl acrylate and dimethyl aminoethyl methacrylate. Of particular interest are the copolymer of acrylamide with the methyl chloride quaternary ammonium salts of dimethylamino ethyl acrylate (ADAME); the copolymer of acrylamide and acrylamidopropyl trimethyl ammonium chloride (APTAC); and the copolymer of acrylamide and acryloloxyethyl trimethyl ammonium chloride (AETAC); and the copolymer of epichlorohydrin and dimethylamine.

Anionic polymers are formed from one or more ethylenically unsaturated anionic monomers or a blend of one or more anionic monomers with one or more of the nonionic monomers mentioned previously. The anionic monomers include acrylic acid, methacrylic acid, maleic acid, crotonic acid, itaconic acid, vinyl sulfonic acid, allyl sulfonic acid, 2-acrylamido-2-methylpropane sulfonic acid (AMPS), acrylamide, mixtures thereof, and salts thereof.

Of particular interest are copolymers and/or terpolymers of monomers selected from the group consisting of acrylamide, 2-acrylamido 2-methylpropane sulfonic acid (AMPS), acrylic acid, and (meth)acrylic acid. For example, the anionic polymer may be selected from the group consisting of copolymers derived from 2-acrylamido 2-methylpropane sulfonic acid, copolymers of acrylic acid and acrylamide, homopolymers of acrylic acid, homopolymers of acrylamide, and combinations thereof. Typically used as anionic polymer are the copolymer of sodium acrylate and acrylamide and the copolymer of acrylic acid and acrylamide.

In certain mining segments whereby the pH range is approximately between about 5 and about 10, of particular interest are copolymers of AMPS and acrylamide wherein the mole percent of AMPS is from about 10 mole percent to about 25 mole percent, and terpolymers of AMPS, acrylamide, and acrylic acid wherein the mole percent of AMPS is from about 10 mole percent to about 30 mole percent, the mole percent of acrylamide is from about 40 mole percent to about 60 mole percent, and the mole percent of acrylic acid is from about 20 mole percent to about 40 mole percent. Otherwise, homopolymers of acrylic acid or copolymers of acrylic acid and acrylamide are of particular interest.

The synthetic polymer can be prepared by polymerization of a water soluble monomer or water soluble monomer blend according to methods well known in the art. The water soluble monomers typically are water soluble monomers or water soluble monomer blend that having a solubility in water of at least 5 g in 100 ml of water.

The natural polymer is first added to the aqueous dispersion and this is followed by the addition of the synthetic polymer to the aqueous dispersion. Although not critical, the synthetic polymer is typically added to the aqueous dispersion within a minute, or even seconds, after the natural polymer is added to the aqueous dispersion.

The amount of natural polymer required to promote lower rheological properties such as yield stress or viscosity will be dependent on the characteristic properties of the natural polymer, the morphology of the particles in the aqueous dispersion, and the concentration of the aqueous dispersion during liquid-solid separation. The weight ratio of natural polymer to synthetic polymer is a ratio that effectively reduces the yield stress of the aqueous dispersion is generally is a ratio is from about 4:1 to about 1:4, and typically ranges from about 0.10:1.0 to about 1.0:1.0, preferably from about 0.25:1.0 to about 0.75:1.0, and more preferably from about 0.25:1.0 to about 0.50:1.0. The total amount of natural polymer and synthetic polymer used to treat the aqueous system varies over wide ranges but typically ranges from about 1.0 to about 1000 grams per metric ton of aqueous system treated, preferably from about 5.0 to about 500 grams per metric ton, and more preferably from about 10.0 to about 100 grams per metric ton.

The total solids found in the aqueous dispersion can vary over wide ranges, but typically ranges from about 25 g/liter to about 2,000 g/liter, such as about 50 g/liter to 2,000 g/liter. The process is particularly useful in reducing the yield stress of the aqueous dispersion where the aspect ratio of the solids is less than about 1.0, more particularly when the aspect ratio is less than about 0.5, and/or the solids if the aqueous dispersion contains a substantial amount of gangue.

EXAMPLES

In all of the examples, unless otherwise noted, the polysaccharide dextran was used as the natural polymer and anionic copolymers were used as the synthetic polymers. In each set of examples, a comparative example was run using only a synthetic polymer, i.e., no natural polymer was used. Mw values for the polysaccharides were determined by SEC-MALLS analyses.

Unless otherwise indicated, the yield stress of the tested aqueous dispersion was determined by adding 1000 mL of an aqueous dispersion to a graduated cylinder, where it was first treated by adding natural polymer to the aqueous dispersion, tamping the natural polymer into the dispersion three times with a plunger having perforated holes. Then, the synthetic polymer was added to the aqueous dispersion using the same mixing technique and number of tamps.

The rate at which the liquid-solid separation occurred was established by starting a timer at the point where the liquid-solid interface reached the 1000 milliliter mark in the graduated cylinder and then recording the time at which the liquid-solid interface reached each additional 50 milliliters down to the 700 milliliter mark. The sedimentation rate was calculated by subtracting the time recorded at the 900 milliliter mark from the time recorded at the 700 milliliter mark.

A compaction value was recorded after 18 hours. The subsequent measurements of yield stress were taken after the 24 hour mark. To prepare the samples for analysis the liquid was siphoned out of the 1000 milliliter graduated cylinders until there were only concentrated solids left in the cylinders. The resulting slurries were quantitatively transferred into appropriately sized beakers. The slurries in the beakers were allowed to rest for an additional 4 hours prior to conducting the yield stress measurements.

The yield stress (in Pa) was measured with a Brookfield HBDVIII Ultra rheometer or Brookfield RVDVIII Ultra rheometer using vane spindles. The tested aqueous dispersion was placed in an appropriately sized beaker for the vane spindle used. The selection of the spindle or rheometer depended on the magnitude of range of yield stress measured. The vane spindle was lowered down into the aqueous dispersion to the vane spindle's primary mark. RHEOCALC® software was used to calculate the yield stress utilizing either the Bingham model or the Casson model where noted.

Descriptions of the polysaccharides used in the examples are set forth in Table I.

TABLE 1

| Reagent | $M_w$ (g/mol) | PDI ($M_w/M_n$) |
| --- | --- | --- |
| Polysaccharide A | <50,000 | 1.01 |
| Polysaccharide B | 713,000 | 3.62 |
| Polysaccharide C | 2,150,000 | 2.09 |
| Polysaccharide D | 4,370,000 | 1.08 |
| Polysaccharide E | 8,870,000 | 1.01 |
| Polysaccharide F | 9,860,000 | 1.30 |

Examples 1-3 and Comparative Example A

These examples illustrate the use of polysaccharides of Table I with a synthetic polymer (Synthetic Polymer B) to concentrate the solids of an aqueous dispersion containing alumina tailings, known in the alumina industry as red mud, and how this affects the yield stress of the concentrated aqueous dispersion. Comparative example A used only Synthetic Polymer B as the polymer treatment.

In these examples, the dextran polysaccharides of varying molecular weight, were added first followed by the addition of Synthetic Polymer B, an anionic copolymer. The amount of solids in the aqueous dispersion was 50 grams per liter. The dosage of dextran plus Synthetic Polymer B in the examples ranged from 250 grams per ton to 400 grams per ton, with a constant synthetic polymer dosage of 200 grams per ton. The dextrans used and the percent dosage of dextran to Synthetic Polymer B are set forth in Table II. The yield stress values of the aqueous dispersions were then measured and the results are also set forth in Table II.

TABLE II

| Example # | Substrate | Solids (g/L) | Reagent(s) | Polysaccharide Dosage as Percentage of Synthetic Polymer Dosage, | | | | | | | |
|---|---|---|---|---|---|---|---|---|---|---|---|
| | | | | 0 | 25 | 33.3 | 37.5 | 50 | 66.7 | 100 | 200 |
| A | Alumina Tailings | 50 | Synthetic Polymer B (1) | 10.21 | — | — | — | — | — | — | — |
| 1 | Alumina Tailings | 50 | Polysaccharide A plus Synthetic Polymer B | — | 6.48 | — | — | 2.32 | — | 2.94 | — |
| 2 | Alumina Tailings | 50 | Polysaccharide D plus Synthetic Polymer B | — | 6.85 | — | — | 5.88 | — | 10.20 | — |
| 3 | Alumina Tailings | 50 | Polysaccharide F plus Synthetic Polymer B | — | 9.28 | — | — | 12.00 | — | 10.40 | — |
| B | Phosphate Ore | 130 | Synthetic Polymer A | 104.1 | — | — | — | — | — | — | — |
| 4 | Phosphate Ore | 130 | Polysaccharide B plus Synthetic Polymer A | — | — | — | 36.8 | 60.9 | — | 52.7 | — |
| 5 | Phosphate Ore | 130 | Polysaccharide C plus Synthetic Polymer A | — | — | — | 22.1 | 54.0 | — | 69.1 | — |
| 6 | Phosphate Ore | 130 | Polysaccharide D plus Synthetic Polymer A | — | — | — | 106.9 | 73.3 | — | 54.4 | — |
| C | Gold Concentrate | 180 | Synthetic Polymer A | 444.2 | — | — | — | — | — | — | — |
| 7 | Gold Concentrate | 180 | Polysaccharide B plus Synthetic Polymer A | — | 339.4 | — | — | 295.8 | — | 276.5 | — |
| 8 | Gold Concentrate | 180 | Polysaccharide C plus Synthetic Polymer A | — | 415.6 | — | — | 394.5 | — | 455.1 | — |
| 9 | Gold Concentrate | 180 | Polysaccharide D plus Synthetic Polymer A | — | — | — | — | 419.7 | — | 410.4 | 400.8 |
| D | Copper Tailings | 90 | Synthetic Polymer A | 239.3 | — | — | — | — | — | — | — |
| 10 | Copper Tailings | 90 | Polysaccharide B plus Synthetic Polymer A | — | 197.1 | — | — | 261.6 | — | 254.7 | — |
| 11 | Copper Tailings | 90 | Polysaccharide C plus Synthetic Polymer A | — | 186.9 | — | — | 361.5 | — | 248 | — |
| 12 | Copper Tailings | 90 | Polysaccharide D plus Synthetic Polymer A | — | 212 | — | — | 216 | — | 177.1 | — |
| 13 | Copper Tailings | 90 | Polysaccharide E plus Synthetic Polymer A | — | 252.9 | — | — | 232.8 | — | 196.5 | — |
| E | Copper Tailings | 198 | Synthetic Polymer C | 537.9 | — | — | — | — | — | — | — |
| 14 | Copper Tailings | 198 | Polysaccharide B plus Synthetic Polymer C | — | — | 543.2 | — | — | 206.3 | 729.6 | — |
| 15 | Copper Tailings | 198 | Polysaccharide C plus Synthetic Polymer C | — | — | 1427 | — | — | 214.5 | 298 | — |
| 16 | Copper Tailings | 198 | Polysaccharide D plus Synthetic Polymer C | — | — | 426.2 | — | — | 470.4 | 371.4 | — |
| F | Copper Tailings | 59 | Synthetic Polymer A (1) | 3.1 | — | — | — | — | — | — | — |
| 17 | Copper Tailings | 59 | Polysaccharide B plus Synthetic Polymer A (2) | — | — | — | — | — | — | 1.14 | — |
| G | Copper Tailings | 59 | Synthetic Polymer A plus Polysaccharide B (2, 3) | — | — | — | — | — | — | 2.28 | — |

Notes
(1) Yield stress value is average of two samples.
(2) Yield stress values were calculated with Casson model.
(3) Synthetic polymer added prior to polysaccharide.

The data in Table II demonstrate that the yield stress values for the aqueous dispersions containing the alumina tailings decreased when the dextran was used in conjunction with Synthetic Polymer B. The data show that the yield stress was reduced as the proportion of polysaccharide dosage to synthetic polymer dosage increased to an optimal ratio. The data also indicate that the yield stress decreased if the ratio of polysaccharide to Synthetic Polymer B was less than or equal to about 1:2 for polysaccharides A and D, and the yield stress decreased if the ratio of polysaccharide to Synthetic Polymer B was less than or equal to about 1:4 for polysaccharide F. Moreover, the data suggest that the lower molecular weight polysaccharides require lower dosages to achieve lower yield stress values.

Examples 4-6 and Comparative Example B

Examples 4-6 and comparative example B were conducted using an aqueous dispersion containing phosphate ore. In these examples, the dextran polysaccharides of varying molecular weight were added first followed by the addition of Synthetic Polymer A, an anionic copolymer. The amount of solids in the aqueous dispersion was 130 grams per liter and the dosage of dextran plus Synthetic Polymer A in the examples ranged from 77 grams per ton to 108 grams per ton with a constant synthetic polymer dosage of 62 grams per ton. The dextrans used and the percent dosage of dextran to Synthetic Polymer A are set forth in Table II. The yield stress values of the aqueous dispersions were then measured and the results are also set forth in Table II and in FIG. 1.

The data in Table II demonstrate that the yield stress values for the aqueous dispersions containing phosphate ore decreased when the dextran was used in conjunction with Synthetic Polymer A. The data show that the yield stress was reduced as the proportion of polysaccharide dosage to synthetic polymer dosage increased to an optimal ratio. The data indicate that the yield stress decreased if the ratio of polysaccharide to Synthetic Polymer A was less than or equal to about 1:4 for polysaccharide B and C, and yield stress decreases if the ratio of polysaccharide to Synthetic Polymer A was greater than equal to about 1:4 for polysaccharide D. Moreover, the data also suggest that lower molecular weight polysaccharides utilize lower dosages to achieve lower yield stress values.

Examples 7-9 and Comparative Example C

Examples 7-9 and comparative example C were conducted using an aqueous dispersion containing gold, sulfides, carbonaceous minerals, and other materials. The amount of solids in the aqueous dispersion was 180 grams per liter and the dosage of dextran plus Synthetic Polymer A in the examples ranged from 17 grams per ton to 35 grams per ton with the synthetic polymer dosage remaining constant at 12 grams per ton. The dextrans used and the percent dosage of dextran to Synthetic Polymer A are set forth in Table II. The yield stress values of the aqueous dispersions were then measured and the results are also set forth in Table II.

The data in Table II demonstrate that the yield stress values for the aqueous dispersions containing gold concentrate decreased when the dextran was used in conjunction with Synthetic Polymer A. The data show that the yield stress decreases most significantly if the ratio of polysaccharide to Synthetic Polymer A is less than or equal to about 1:2 for polysaccharide. The data indicate that the yield stress for the aqueous dispersion containing gold ore decreases if the dextran is used in conjunction with Synthetic Polymer A. Moreover, the data also suggest that lower molecular weight polysaccharides require lower dosages to achieve lower yield stress values.

Examples 10-13 and Comparative Example D

Examples 10-13 and comparative example D were conducted using an aqueous dispersion containing copper, sulfides, tailings, and other materials. In addition, polysaccharide E was also tested. The amount of solids in the aqueous dispersion was 90 grams per liter and the dosage of dextran plus Synthetic Polymer A in the examples ranged from about 21 grams per ton to 34 grams per ton with the synthetic polymer dosage remaining constant at 17 grams per ton. The dextrans used and the percent dosage of dextran to Synthetic Polymer A are set forth in Table II. The yield stress values of the aqueous dispersions were then measured and the results are also set forth in Table II.

The data in Table II demonstrate that the yield stress for the aqueous dispersion containing copper tailings and other materials decreased when the dextran was used in conjunction with Synthetic Polymer A. The data show that the yield stress decreases if the ratio of polysaccharide to Synthetic Polymer A is less than or equal to about 2:3 for polysaccharide B and C, and D. Moreover, the data suggest that lower molecular weight polysaccharides require lower dosages to achieve lower yield stress values.

Examples 14-16 and Comparative Example E

Examples 14-16 and comparative example E were conducted using an aqueous dispersion containing copper, sulfides, tailings, and other materials. The amount of solids in the aqueous dispersion was 198 grams per liter and the dosage of dextran plus Synthetic Polymer C in the examples ranged from 18 grams per ton to 27 grams per ton with the synthetic polymer dosage remaining constant at 14 grams per ton. The dextrans used and the weight percent of dextran and Synthetic Polymer C (dosage ratio) are set forth in Table II. The yield stress of the aqueous dispersion was then measured and the results are also set forth in Table II.

The data in Table II demonstrate that the yield stress for the aqueous dispersions containing copper tailings and other materials decreased when the dextran was used in conjunction with Synthetic Polymer C. The data indicate that the yield stress decreases if the ratio of polysaccharide to Synthetic Polymer C is less than or equal to about 2:3 for polysaccharide B, C, and D.

Examples 1-16 illustrate that the yield stress value exhibited by an aqueous dispersion is reduced by adding a dextran to the aqueous dispersion followed by anionic copolymer, particularly for certain natural polymers with an appropriate Mw and for particular weight ratios of natural polymer to synthetic polymer. This discovery is important because reducing the yield stress of the aqueous dispersion means that the initial energy required to begin pumping the dispersion is reduced. Reducing yield stress results in cost savings and increased flow rates when the aqueous dispersion is pumped through the pipes that transport the aqueous dispersion to the facility where valuable resources are separated from the solids of the aqueous dispersion and when the aqueous dispersion is pumped through the equipment used to separate valuable resources from the solids in the aqueous dispersion. This can be accomplished without significantly increasing the sedimentation rate of the solids in the aqueous dispersion.

Example 17 and Comparative Examples F, and G

For Example 17, the procedure of Examples 10-13 was repeated using an aqueous dispersion containing copper, sulfides, tailings, and other materials. However, in comparative example F, only Synthetic Polymer A was used, and in comparative example G, the order of addition was reversed, i.e. the synthetic polymer was added before the natural polymer. The amount of solids in the aqueous dispersion was 59 grams per liter. The dosage of dextran plus Synthetic Polymer A in the examples remained constant at 34 grams per ton with the synthetic polymer dosage remaining constant at 17 grams per ton. The yield stress values of the aqueous dispersions were then measured and the results are set forth in Table II.

Figure 2:
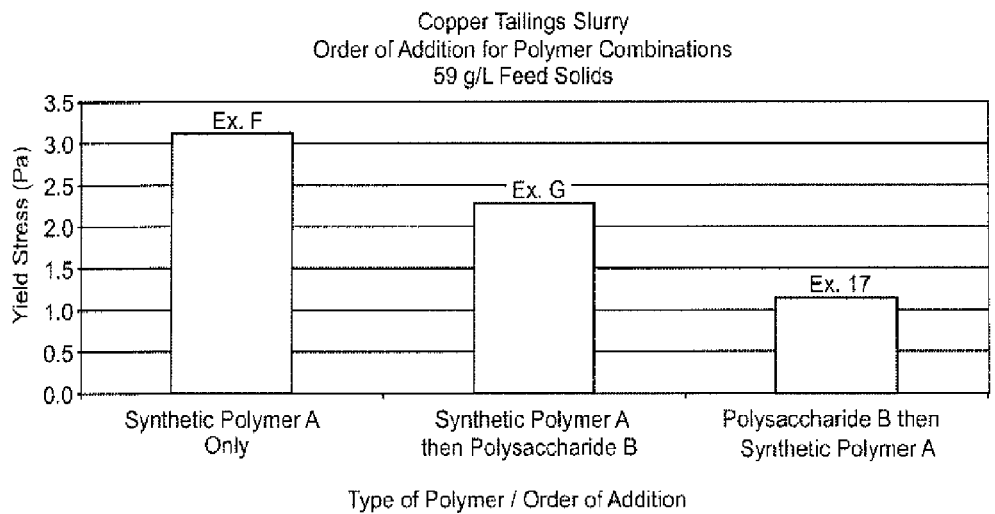
FIG. 2 is a bar graph showing how yield stress is affected by the order of addition of the polysaccharide and synthetic polymer in an aqueous dispersion containing copper tailings.

The data in Table II demonstrate that the yield stress values for the aqueous dispersions containing copper tailings, and other materials decreased when the dextran was used in conjunction with Synthetic Polymer A. FIG. 2 indicates that the yield stress decreases if the polysaccharide is added first followed by the addition of synthetic polymer.

Comparative Examples H, I, J, and K

The procedure of Example 1 was repeated using an aqueous dispersion containing alumina tailings, red mud, and other materials, but only Synthetic Polymer B was used to determine the effect on yield stress if no natural polymer was used. The amount of solids in the aqueous dispersion was about 50 grams per liter and the dosage of the Synthetic Polymer B in the examples ranged from 54 grams per ton to 200 grams per ton. The yield stress of the aqueous dispersion was then measured and the results are set forth in Table III.

TABLE III

| Example # | Substrate | Solids (g/L) | Reagent | Synthetic Polymer Dosage (g/T) Yield Stress (Pa) | | | |
|---|---|---|---|---|---|---|---|
| | | | | 54 | 107 | 200 | 200 |
| H | Alumina Tailings | 47 | Synthetic Polymer B | 4.97 | — | — | — |
| I | Alumina Tailings | 47 | Synthetic Polymer B | — | 9.22 | — | — |
| J | Alumina Tailings | 50 | Synthetic Polymer B | — | — | 10.60 | — |
| K | Alumina Tailings | 50 | Synthetic Polymer B | — | — | — | 9.82 |

The data in Table III demonstrate that the yield stress values for the aqueous dispersions containing alumina tailings and other materials increased when the dosage of Synthetic Polymer B was increased. This is just the opposite from all previous examples where the natural polymer was added first and then followed by the addition of synthetic polymer.

Examples 18-19 and Comparative Example L

Figure 3:
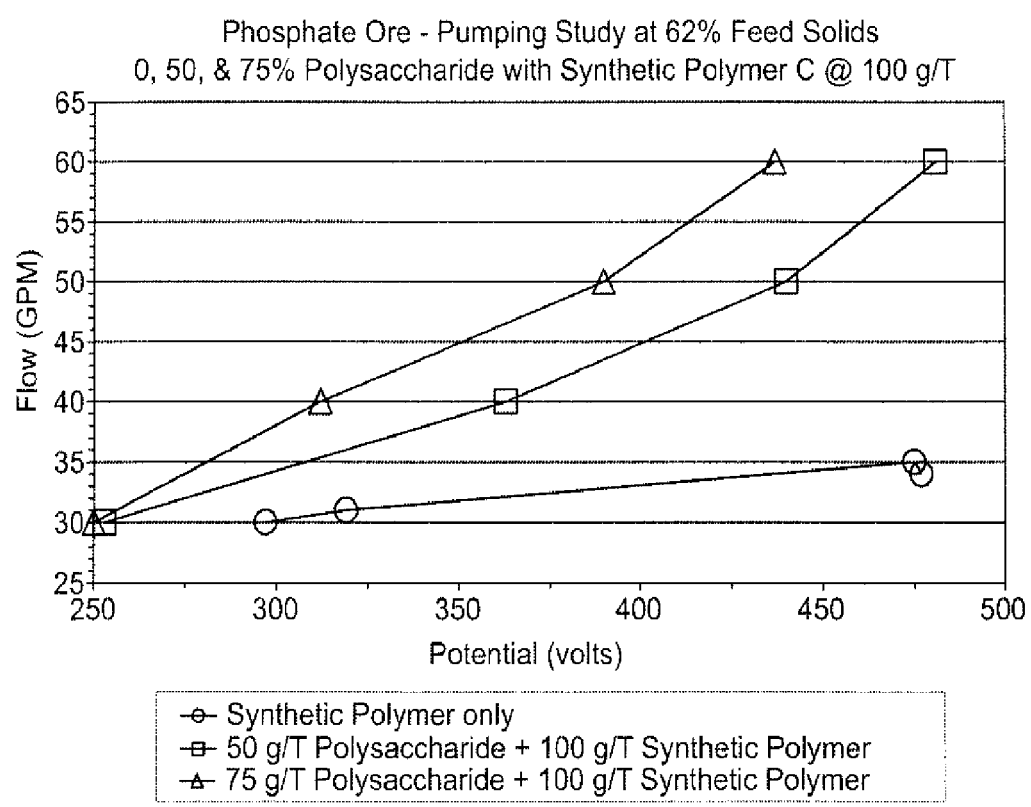
FIG. 3 is a graphic depiction showing how flow rate is affected by the addition of the polysaccharide and synthetic polymer in an aqueous dispersion containing phosphate ore.

Examples 18-19 and comparative example L were conducted using an aqueous dispersion containing phosphate ore. In these examples, the dextran polysaccharides of varying molecular weight were added first followed by the addition of Synthetic Polymer D, an anionic copolymer. The amount of solids in the aqueous dispersion was 1099 grams per liter and the dosage of dextran plus Synthetic Polymer D in the examples ranged from 50 grams per ton to 75 grams per ton with a constant synthetic polymer dosage of 100 grams per ton. The dextran used and the percent dosage of dextran to Synthetic Polymer C are set forth in Table IV. The flow rate values for the aqueous dispersions at given pump potentials were then measured and the results are also set forth in Table IV and FIG. 3.

The data in Table IV demonstrates that the material flow rates values for the aqueous dispersions containing phosphate ore increased when the dextran was used in conjunction with Synthetic Polymer D. The data show that the flow rate was increased as the proportion of polysaccharide dosage to synthetic polymer dosage increased.

TABLE IV

| Substrate | Solids (g/L) | | Treatment/Pump Metrics | | | |
|---|---|---|---|---|---|---|
| Phosphate Ore Example # | 1099 Reagent | | Natural Polymer Percent Dosage (%) | Flow (GPM) | Potential (volts) | Current (amps) |
| | L | Synthetic Polymer D Only | 0 | 30 | 297 | 2.8 |
| | L | Synthetic Polymer D Only | 0 | 34 | 477 | 3.3 |
| | L | Synthetic Polymer D Only | 0 | 31 | 319 | 2.8 |
| | L | Synthetic Polymer D Only | 0 | 35 | 475 | 3.3 |
| | 18 | Polysaccharide C plus Synthetic Polymer D | 50 | 30 | 253 | 2.7 |
| | 18 | Polysaccharide C plus Synthetic Polymer D | 50 | 40 | 363 | 3.0 |
| | 18 | Polysaccharide C plus Synthetic Polymer D | 50 | 50 | 440 | 3.4 |
| | 18 | Polysaccharide C plus Synthetic Polymer 0 | 50 | 60 | 481 | 4.0 |
| | 19 | Polysaccharide C plus Synthetic Polymer D | 75 | 30 | 250 | 2.7 |
| | 19 | Polysaccharide C plus Synthetic Polymer D | 75 | 40 | 312 | 2.8 |
| | 19 | Polysaccharide C plus Synthetic Polymer D | 75 | 50 | 390 | 3.1 |
| | 19 | Polysaccharide C plus Synthetic Polymer D | 75 | 60 | 437 | 3.7 |

We claim:

1. A process for improving the flow rate of an aqueous dispersion comprising:
    (a) adding a natural polymer having a molecular weight of about 5,000 to about 40,000,0000 and a PDI of from about 1.0 to about 10.0 to the aqueous dispersion, and
    (b) then adding a synthetic polymer having a molecular weight of about 500,000 to about 25,000,000 to the aqueous dispersion, wherein the natural polymer and the synthetic polymer are added in a weight ratio of about 4:1 to about 1:4 in an amount effective to increase the flow rate of the aqueous dispersion;
    wherein the total solids of the aqueous dispersion is from about 25 g/liter to about 2.00 g/liter and comprises an ore containing phosphate, copper, gold, gangue or other minerals; and
    wherein the yield stress of the aqueous dispersion is reduced by at least 25% after addition of the natural and synthetic polymers.

2. The process of claim 1 wherein the natural polymer is a polysaccharide.

3. The process of claim 2 wherein the polysaccharide is a dextran.

4. The process of claim 3 wherein the synthetic polymer is selected from the group consisting of water soluble anionic polymers, cationic polymers, amphoteric polymers, nonionic polymers, and mixtures thereof.

5. The process of claim 4 wherein the synthetic polymer is an anionic polymer.

6. The process of claim 5 wherein the anionic polymer is selected from the group consisting of copolymers derived from 2-acrylamido 2-methylpropane sulfonic acid, copolymers of acrylic acid and acrylamide, homopolymers of acrylic acid, homopolymers of acrylamide, and combinations thereof.

7. The process of claim 5 wherein the anionic polymer comprises a copolymer of sodium acrylate and acrylamide or a copolymer of acrylic acid and acrylamide.

8. The process of claim 5 wherein the pH of the anionic polymer is about 5 to about 10.

9. The process of claim 5 wherein Mw of the anionic polymer is about 500,000 to about 25,000,000.

10. The process of claim 1 wherein the weight ratio is about 0.10:1.0 to about 1.0:1.0.

11. The process of claim 1, wherein the aspect ratio of the solids is less than about 1.0.

12. The process of claim 2 wherein the polysaccharide is selected from the group consisting of potato starch, xanthan gums, guars, cellulose derivatives and glycosaminoglycans.

13. A process for improving the flow rate of an aqueous dispersion comprising
    (a) adding a lignosulfonate having a molecular weight of about 5,000 to about 40,000,0000 and a PDI of from about 1.0 to about 10.0 to the aqueous dispersion, and
    (b) then adding a synthetic polymer having a molecular weight of about 500,000 to about 25,000,000 to the aqueous dispersion, wherein the lignosulfonate and the synthetic polymer is an amount effective to increase the flow rate of the aqueous dispersion.

\* \* \* \* \*